United States Patent [19]

Tanaka

[11] Patent Number: 5,751,504
[45] Date of Patent: May 12, 1998

[54] DIGITAL VIDEO AND AUDIO SIGNAL RECORDING APPARATUS

[75] Inventor: Mitsugu Tanaka, Tokyo, Japan

[73] Assignee: Canon Kabushiki Kaisha, Tokyo, Japan

[21] Appl. No.: 638,846

[22] Filed: Apr. 29, 1996

Related U.S. Application Data

[62] Division of Ser. No. 541,981, Oct. 10, 1995, Pat. No. 5,541,739, which is a continuation of Ser. No. 201,071, Feb. 24, 1994, abandoned, which is a continuation of Ser. No. 713,407, Jun. 11, 1991, abandoned.

[30] Foreign Application Priority Data

Jun. 15, 1990 [JP] Japan ................................ 02-157328

[51] Int. Cl.$^6$ .................................................. G11B 5/02
[52] U.S. Cl. ............................................. 360/19.1; 360/20
[58] Field of Search ................................ 360/32, 18, 19.1, 360/20, 27, 8, 24; 386/33, 39; 369/59, 47, 48, 49

[56] References Cited

U.S. PATENT DOCUMENTS

| | | | |
|---|---|---|---|
| 4,303,950 | 12/1981 | Taniguchi et al. | 360/19.1 |
| 4,862,292 | 8/1989 | Enari et al. | 360/32 X |
| 4,920,424 | 4/1990 | Hosaka et al. | 360/19.1 X |
| 4,947,271 | 8/1990 | Nakayama et al. | 360/19.1 |
| 5,051,846 | 9/1991 | Tsushima et al. | 360/19.1 |
| 5,063,452 | 11/1991 | Higurashi | 360/19.1 |
| 5,065,259 | 11/1991 | Kubota et al. | 360/19.1 X |
| 5,130,816 | 7/1992 | Yoshio | 369/59 X |
| 5,541,739 | 7/1996 | Tanaka | 360/19.1 X |

*Primary Examiner*—Paul W. Huber
*Attorney, Agent, or Firm*—Robin, Blecker, Daley & Driscoll

[57] ABSTRACT

A digital signal recording apparatus is arranged to be capable of permitting long-time recording on one and the same recording medium without impairing the quality of audio signals at all. The apparatus has a first mode in which a digital video signal supplied from a video input circuit and having the amount of information not compressed by a video compression circuit is recorded on the recording medium by a recording circuit while all of n channel digital audio signals supplied from an audio input circuit are recorded by the recording circuit; and a second mode in which the digital video signal having the amount of information compressed by the video compression circuit and only part of the n channel digital audio signals supplied from the audio input circuit are recorded by the recording circuit.

13 Claims, 3 Drawing Sheets

DIGITAL VIDEO AND AUDIO SIGNAL RECORDING APPARATUS

This application is a division of application U.S. Ser. No. 08/541,981, filed Oct. 10, 1995, now U.S. Pat. No. 5,541, 739, which is a continuation of U.S. Ser. No. 08/201,071, filed Feb. 24, 1994, abandoned, which is a continuation of U.S. Ser. No. 07/713,407, filed Jun. 11, 1991, abandoned.

BACKGROUND OF THE INVENTION

1. Field of the Invention

This invention relates to an audio signal recording apparatus and more particularly to an apparatus which records an audio signal as a digital signal.

2. Description of the Related Art

A digital recording apparatus which records video and audio signals as digital signals on a magnetic tape with a rotary head in a helical scanning manner is known by the name of a digital VTR. In the case of an analog VTR which records video and audio signals as analog signals on a magnetic tape in the helical scanning manner, the VTR is arranged to be operable either in a standard-time recording/ reproducing mode in which recording and reproduction can be performed for a standard length of time (hereinafter referred to as the SP mode) or in a long-time recording/ reproduction mode in which recording and reproduction can be performed over a longer period of time (hereinafter referred to as the LP mode). The digital VTR of the above-stated kind is also arranged to permit recording and reproduction in the LP mode by compressing the recordable amount of data per unit time.

FIG. 1 is a block diagram showing in outline the arrangement of the conventional digital VTR. An input terminal 10 is arranged to receive the luminance signal component Y of a video signal. Input terminals 12 and 14 are arranged to receive the chrominance signal components PR and PB of the video signal. Input terminals 16, 18, 20 and 22 are arranged to receive audio signals of four channels. The analog signals supplied to these input terminals 10 to 22 are digitized by A/D converters 24, 26, 28, 30, 32, 34 and 36. The digital video signal data which is thus obtained is temporarily stored by a memory 38V. The digital audio signal data thus obtained is temporarily stored by a memory 38A. A video encoder 40 is arranged to perform a recording processing action on the video data stored in the memory 38V before recording it on a recording medium. An audio encoder 42 is arranged to perform a recording processing action on the audio data stored in the memory 38A also for recording on the recording medium. An adder 44 is arranged to add together (time-base multiplex) the output of the video encoder 40 and that of the audio encoder 42 and to output them in a time-base multiplexed state. A recording amplifier 46 is arranged to amplify the output of the adder 44. A rotary head 48 is arranged to record the output of the recording amplifier 46 on a magnetic tape 50 by electro-magnetically converting the output of the amplifier 46.

However, if recording is performed in the LP mode capable of recording for a period of time which is, for example, twice as long as the time of the SP mode, the above-stated arrangement presents a problem which is as described below:

In the case of an analog VTR, the amount of information of the analog audio signal to be recorded in each track changes little in the LP mode, since it is only the track pitch that is reduced to one half while the number of tracks formed per unit time remains unchanged. Further, even in the event of an analog VTR which is arranged to record a digital audio signal along with an analog video signal, the amount of information of the audio signal does not change at all.

Whereas, in the case of the digital VTR, the number of tracks formed per unit time becomes ½ of it. Therefore, the amount of information of the audio signal to be recorded per unit time also must be reduced accordingly. However, a mere arrangement to perform high-efficiency encoding by utilizing the correlation of signals in reducing the amount of data of the audio signal of each channel to ½ of it greatly degrades the quality of the audio signal, because: unlike the video signal, the audio signal does not have much correlation between adjacent samples. Besides, for the audio signal, it is impossible to use any two-dimensional correlation (obtained in the vertical direction of an image) or three-dimensional correlation (in the direction of time).

SUMMARY OF THE INVENTION

Such being the background situation, it is an object of this invention to provide a digital video and audio signal recording apparatus which is capable of retaining an adequate tone quality even in the event of a small amount of audio information per unit time.

It is another object of the invention to provide a digital video recorder which is capable of recording a digital video signal in the LP mode without degrading the tone quality of an audio signal.

Under this object, a digital signal recording apparatus which is arranged according to this invention comprises video input means for receiving a digital video signal; audio input means for receiving n channel digital audio signals (n: an integer which is at least 2); video compressing means for compressing an amount of information of the digital video signal; recording means for recording the digital video signal and the digital audio signals on a recording medium; and mode changeover means for changing over the apparatus between a plurality of modes which includes a first mode in which the digital video signal supplied from the video input means without passing through the video compressing means and all of the n channel digital audio signals supplied from the audio input means are recorded by the recording means, and a second mode in which the digital video signal having the amount of information compressed by the video compressing means and only part of the n channel digital audio signals supplied from the audio input means are recorded by the recording means.

It is a further object of the invention to provide an audio signal recording apparatus which is of the kind having the amount of information recordable per unit time variable and is arranged to be capable of recording a desired audio signal even when the amount of information recordable per unit time is reduced.

Under that object, a digital signal recording apparatus arranged according to this invention comprises input means for receiving n channel digital audio signals (n: an integer which is at least 2); compressing means for compressing an amount of information of each of the n channel digital audio signals supplied from the input means; and recording means for selectively recording on a recording medium either the n channel digital audio signals having the amount of information compressed by the compressing means or n/m channel digital audio signals (m: an integer which is at least 2 and less than n) among the n channel digital audio signals supplied from the input means without passing through the compressing means.

These and other objects and features of this invention will become apparent from the following detailed description of

DETAILED DESCRIPTION OF THE PREFERRED EMBODIMENTS

Figure 2:
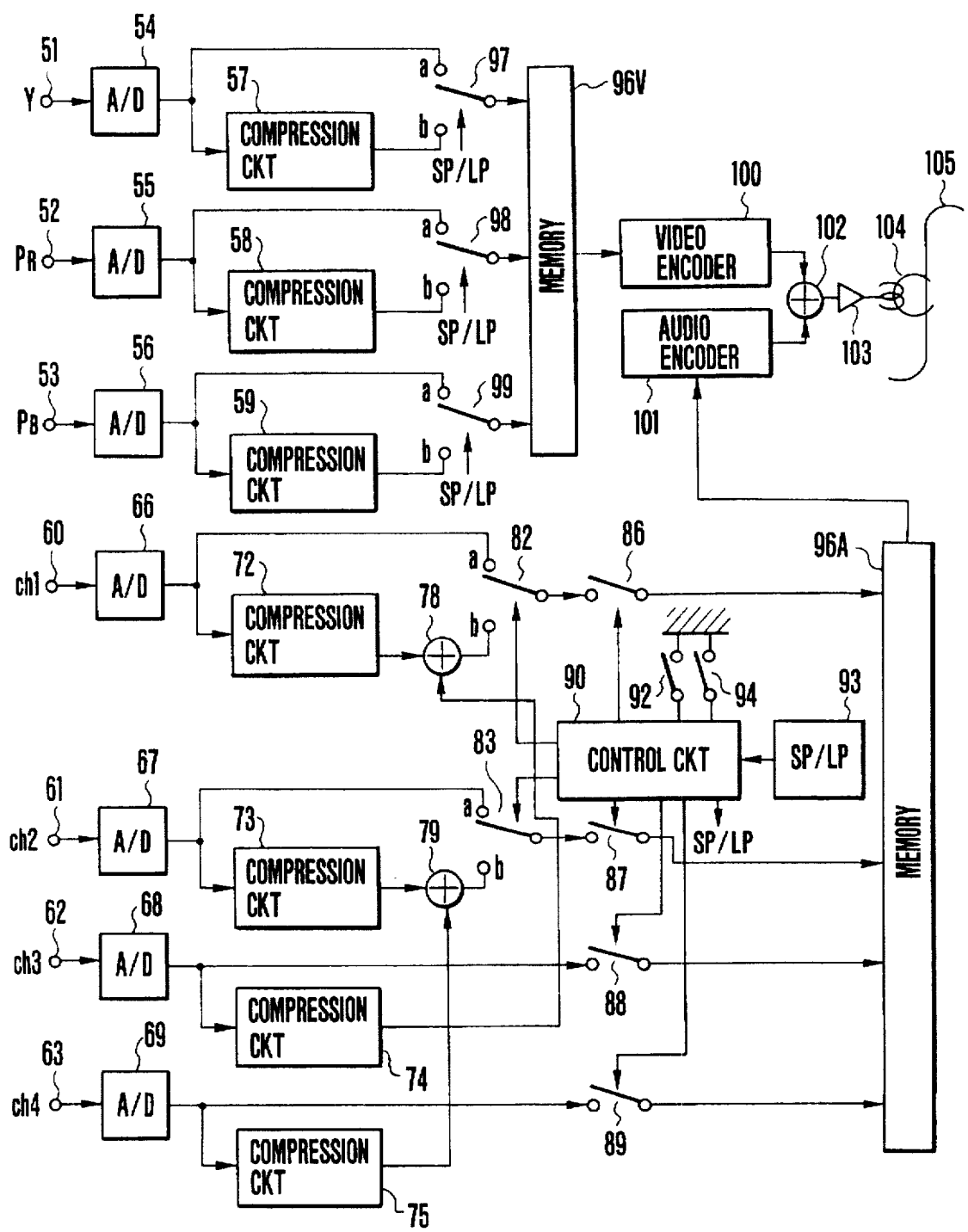
FIG. 2 is a block diagram showing the circuit arrangement of a digital VTR which is arranged as an embodiment of this invention.

FIG. 2 shows in a block diagram the circuit arrangement of a digital VTR which is arranged as an embodiment of this invention. Referring to FIG. 2, input terminals 51, 52 and 53 are arranged to receive the luminance signal component Y and chrominance signal components PR and PB of a video signal, respectively. Input terminals 60, 61, 62 and 63 are arranged to receive four channel audio signals of channels ch1, ch2, ch3 and ch4, respectively. A/D converters 54, 55 and 56 are arranged to digitize the signal components Y, PR and PB supplied from the input terminals 51, 52 and 53, respectively. A/D converters 66, 67, 68 and 69 are arranged to digitize the analog audio signals supplied from the input terminals 60 to 63, respectively. Compression circuits 57, 58 and 59 are arranged to compress the amount of information of video data output from the A/D converters 54, 55 and 56 to ½, respectively, by carrying out a high efficiency encoding process such as predictive differential encoding. Compression circuits 72, 73, 74 and 75 are arranged to compress the amount of audio data output from the A/D converters 66, 67, 68 and 69 to ½, respectively, by carrying out a compounding differential encoding process or the like. Adders 78 and 79 are arranged to multiplex on the time base the outputs of the compression circuits 72 and 73 with those of the compression circuits 74 and 75, respectively. Switches 82 and 83 are arranged to select the outputs of the A/D converters 66 and 67 or the outputs of the adders 78 and 79, respectively. Switches 86, 87, 88 and 89 are arranged to select the channels to be recorded. Switches 97, 98 and 99 are arranged to select the outputs of the A/D converters 54, 55 and 56 or the outputs of the compression circuits 57, 58 and 59, respectively.

Figure 1:
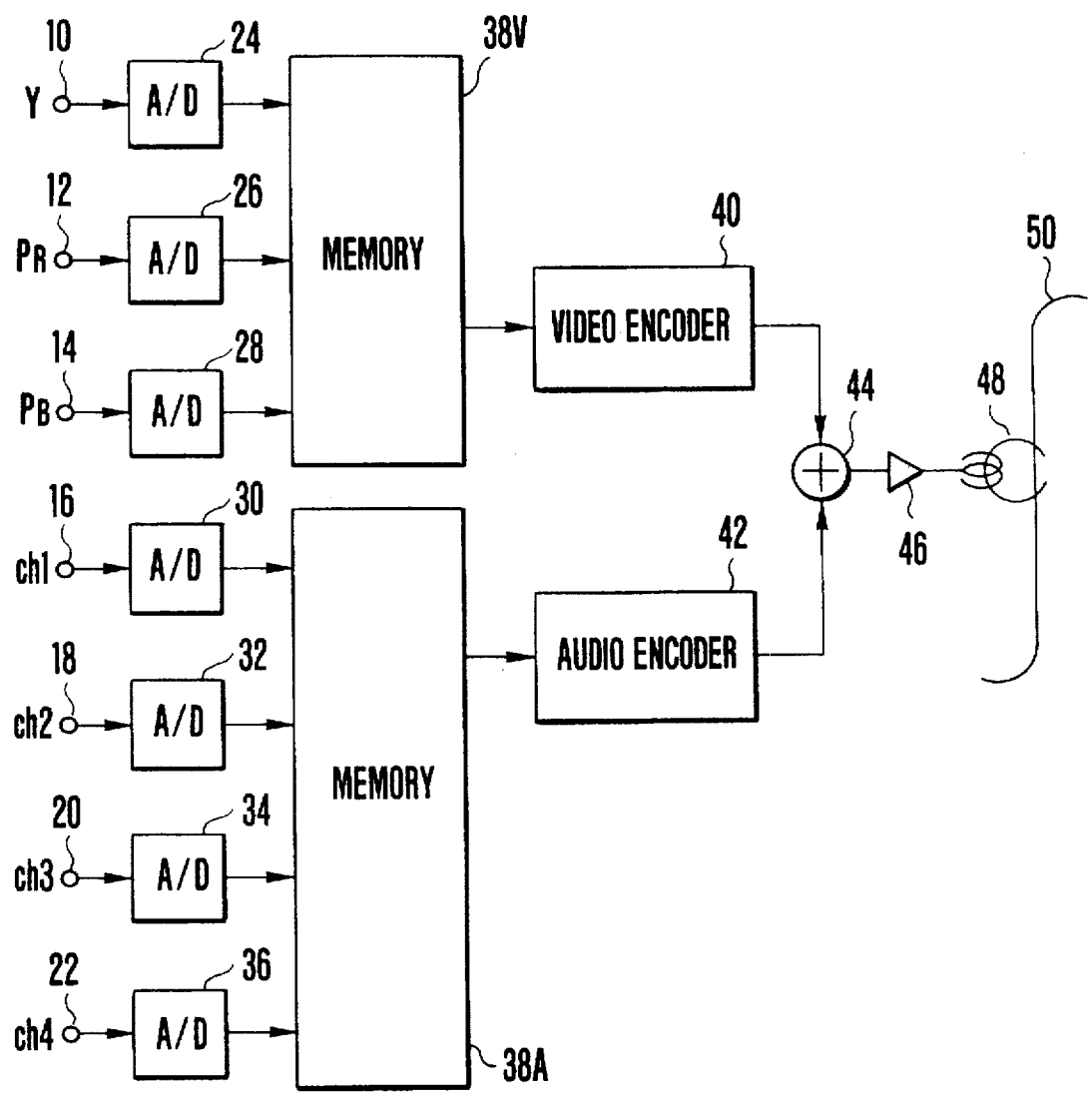
FIG. 1 is a block diagram showing in outline the arrangement of the conventional digital VTR.

A control circuit 90 is arranged to control the switching actions of the switches 82, 83 and 86 to 89. External switches 92 and 94 are provided on an operation panel for giving instructions for the switching positions of the switches 86 to 89. A changeover switch 93 is arranged to switch the SP (standard-time) mode over to the LP (long-time) mode and vice versa. Memories 96V and 96A are similar to the memories 38V and 38A shown in FIG. 1. Video data and audio data stored in the memories 96V and 96A are arranged to be supplied to a video encoder 100 and an audio encoder 101 to be subjected to recording processes, respectively. The processed video and audio data are time-base multiplexed with each other by an adder 102. The output of the adder 102 is supplied via an amplifier 103 to a rotary head 104 to be recorded on a magnetic tape 105.

The operation in the SP mode of the VTR of FIG. 2 is first described as follows: in this instance, the SP/LP changeover switch 93 is operated to cause an SP/LP changeover signal to be output from the control circuit 90. The SP/LP changeover signal shifts the connecting positions of the switches 97, 98 and 99 to their contacts "a", respectively.

Further, by using the SP/LP changeover signal, the control circuit 90 connects the switches 82 and 83 to their contacts "a" and brings the switches 86 to 89 into their closed states.

Under this condition, the video signals supplied to the input terminals 51, 52 and 53 are digitized, respectively, by the A/D converters 54, 55 and 56. The digital video data thus obtained are supplied to the memory 96V via the terminals "a" of the switches 97, 98 and 99, respectively. The audio signals supplied to the input terminals 60 to 63 are digitized, respectively, by the A/D converters 66 to 69. The data output from the A/D converters 66 and 67 are supplied to the memory 96A via the contacts "a" of the switches 82 and 83 and the switches 86 and 87, respectively. The data output from the A/D converters 68 and 69 are supplied to the memory 96A via the switches 88 and 89, respectively. The video and audio data stored in the memories 96V and 96A are read out in the same manner as in the case of the example of the conventional VTR described in the foregoing. These data are then respectively subjected to the recording signal processing actions of the encoders and 100 and 101. The outputs of the encoders 100 and 101 are multiplexed with each other at the adder 102. The output of the adder 102 is recorded on the magnetic tape 105 through the recording amplifier 103 and the rotary head 104.

Next, the operation in the LP mode of the VTR is described as follows: in the LP mode, the SP/LP changeover signal causes the switches 97, 98 and 99 to be connected to their contacts "b". The video signals from the input terminals 51, 52 and 53 are supplied via the A/D converters 54, 55 and 56 to the compression circuits 57, 58 and 59 to have the amount of information thereof compressed to ½, respectively. The compressed video data thus obtained are supplied to the memory 96V. Therefore, in this case, the amount of information of the video data supplied to the adder 102 becomes ½ of the amount of information supplied in the SP mode. Then, assuming that the rotary head 104 is arranged to record one track per one rotation in the SP mode, the rotary head 104 makes two rotations to record one track in the LP mode. Further, it is assumed that the traveling speed of the tape 105 in the LP mode is ½ of the speed set for the SP mode.

In the LP mode, the audio data is recorded as follows: to ensure about the same degree of tone quality in the LP mode as the quality attainable in the SP mode, this embodiment is arranged to record only two channel audio signals among the four channel audio signals. In this instance, the external switch 92 is turned on to select a 2-channel audio mode. In the 2-channel audio mode, arbitrary two of the switches 86 to 89 are closed while the rest are opened. If the switches 86 and 87 are arranged to be closed in this instance, the control circuit 90 connects the corresponding switches 82 and 83 to their contacts "a". As a result, arbitrary two channel audio signals among the four channel audio signals of the channels ch1 to ch4 are supplied to the memory 96A. After that, the two channel audio signals are recorded on the magnetic tape 105 with the same tone quality as in the SP mode.

In cases where a lower tone quality is allowable for the LP mode than the tone quality obtainable in the SP mode, all of the four channel audio signals are recorded. In that instance, the external switch 94 is turned on to select a 4-channel audio mode. In the 4-channel audio mode, the control circuit 90 connects the switches 82 and 83 to their contacts "b" and closes the switches 88 and 89. As a result, the data output from the A/D converters 66 to 69 are compressed by the compression circuits 72 to 75. The compression circuits 72 to 75 are arranged, for example, to compress a PCM code of 16 bits into a code of 8 bits. The adders 78 and 79 add the output data of the compression circuits 74 and 75 to those of the compression circuits 72 and 73, respectively. The data rate of the outputs of the adders 78 and 79 becomes the same as the rate obtained in the SP mode. The outputs of the adders 78 and 79 are supplied to the memory 96A via the switches 82 and 83 and the switches 86 and 87, respectively. As a result, the memory 96A stores all of the four channel, audio signals, although they are in the compressed state. After that, these signals are subjected to the processing action for recording in the same manner as in the SP mode before they are recorded on the magnetic tape 105 along with the video data.

In the case of the embodiment shown in FIG. 2, the number of channels for recording and the tone quality are arranged to be selectable by the operator by selecting the 2-channel audio mode or the 4-channel audio mode. However, this arrangement may be changed to have one of the two audio modes automatically selected according to the incoming audio signals. An example of such a modification is shown in FIG. 3.

Figure 3:
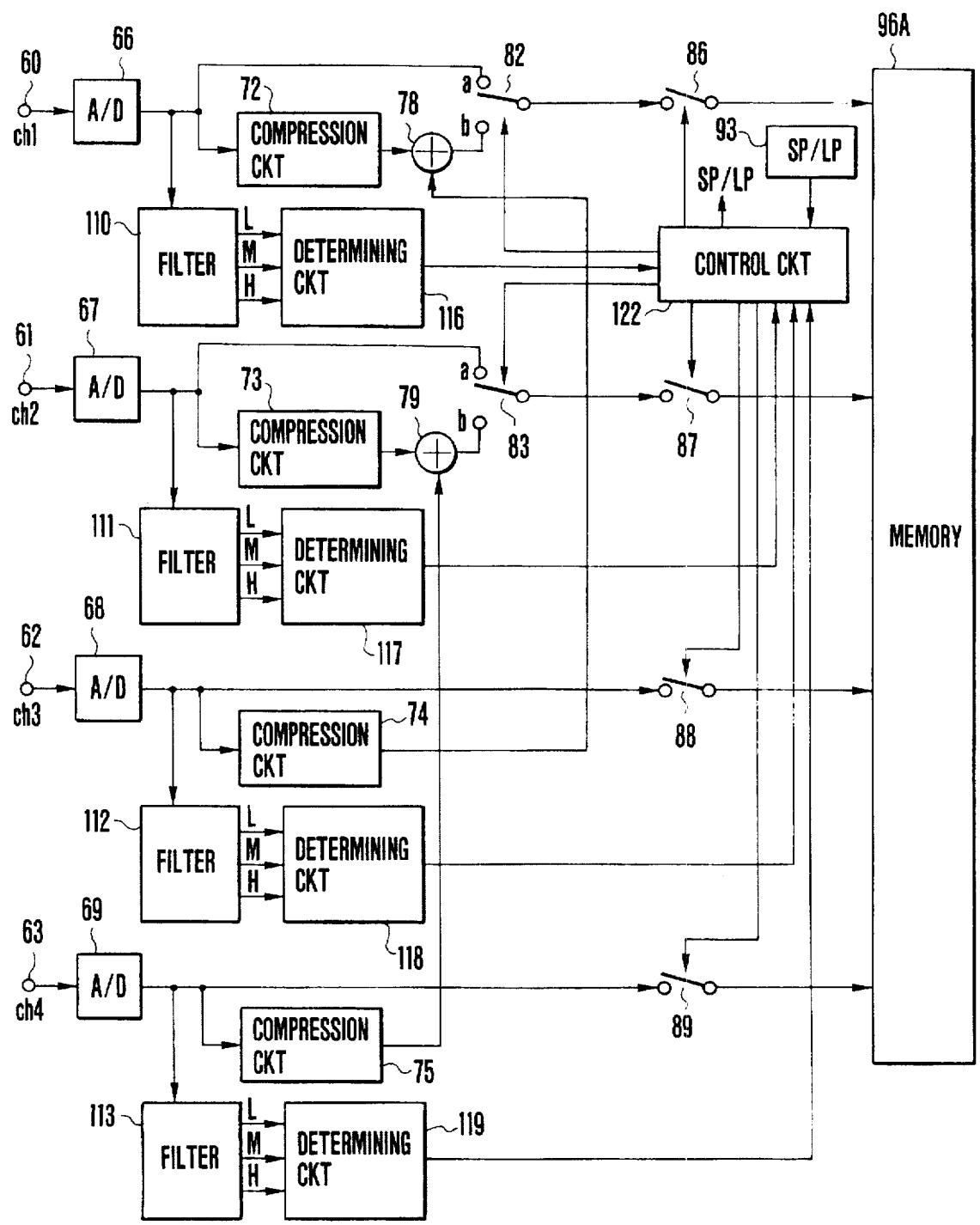
FIG. 3 is a block diagram showing the circuit arrangement of the essential parts of a digital VTR which is arranged as another embodiment of the invention.

FIG. 3 is a block diagram showing in outline the arrangement of the essential parts of a digital VTR which is another embodiment of the invention. In FIG. 3, the same component elements as those of FIG. 2 are indicated by the same reference numerals. Referring to FIG. 3, the embodiment includes filters 110, 111, 112 and 113 which are arranged to divide the frequencies of each of the output data of the A/D converters 66 to 69 into a low band L which is around 20 Hz, a medium band M which is around 10 KHz and a high band H which is around 20 KHz. Determining circuits 116, 117, 118 and 119 are arranged to determine the tone quality on the basis of the band outputs L, M and H of each of the filters 110, 111, 112 and 113. A control circuit 122 is arranged to control the switches 82, 83 and 86 to 89 as stated in the foregoing according to the result of determination made by the determining circuits 116 to 119.

Each of the determining circuits 116 to 119 comprises, for example, integrating circuits which are arranged to integrate the band outputs L, M and H of each of the filters 110 to 113 and comparison circuits which are arranged to compare the outputs of the integrating circuits with threshold values set according to their dynamic ranges. These determining circuits are thus arranged to determine the audio signals as to whether they include all the components including the low, medium and high bands or only the low or medium band. The control circuit 122 selects the 2-channel recording (2-channel audio mode) if the input audio signals have a high tone quality or the 4-channel recording (4-channel audio mode) if the input audio signals have a low tone quality.

As apparent from the foregoing description, the digital VTR described is capable of carrying out recording in the LP mode without lowering the tone quality of the recording audio signals. Further, another advantage of the VTR lies in that the audio recording mode in which priority is given to the number of channels or the mode in which priority is given to tone quality is selectable as desired according to the purpose, nature, etc., of the audio signals to be recorded.

What is claimed is:

1. A digital signal recording apparatus, comprising:
   a) compressing means for compressing a number of bits of each sample of N channel digital audio signals N being an integer 2 or more; and
   b) recording means for recording a digital video signal and one of a first digital audio signal which has N channels and is processed through said compressing means and a second digital audio signal which has N/M channels and is obtained without passing through said compressing means, M being an integer 2 or more, an amount of information of the digital video signal are determined irrespective of whether the first audio signal or the second audio signal is recorded.

2. An apparatus according to claim 1, wherein the amount of information per unit time of the first digital audio signal is equal to that of the second digital audio signal.

3. An apparatus according to claim 1, wherein said recording means includes N/M time-base multiplexing circuits arranged to time-base multiplex every M channel digital audio signals included in the first digital audio signal, and N/M switching circuits arranged to selectively output either the digital audio signals output from said N/M time-base multiplexing circuits or the second digital audio signals.

4. An apparatus according to claim 1, wherein said recording means is arranged to selectively record on the recording medium, in accordance with an operation performed on a manual operation member, the first digital audio signal or the second digital audio signal.

5. An apparatus according to claim 1, wherein said recording means includes determining means for determining a tone quality of at least one of the N channels of the first digital audio signal, and is arranged to selectively record on the recording medium, according to an output of said determining means, either the first digital audio signal or the second digital audio signal.

6. An apparatus according to claim 5, wherein said determining means includes a separation circuit arranged to separate the digital audio signal into different frequency components.

7. A digital signal recording apparatus comprising:
   a) compressing means for compressing a number of bits of each sample of a digital audio signal having a plurality of channels;
   b) recording means for recording a digital video signal and a digital audio signal on a recording medium; and
   c) mode changeover means for changing over said apparatus between a plurality of modes, said plurality of modes including:
   a first mode in which a first digital video signal and a first digital audio which has a plurality of channels and is processed through said compressing means are recorded by said recording means; and
   a second mode in which a second digital video signal and a second digital audio signal which has less number of channels, and is obtained without passing through said compressing means are recorded by said recording means, wherein an amount of information of the first digital video signal is substantially the same as the second digital video signal.

8. An apparatus according to claim 7, wherein said plurality of modes further include a third mode in which a third digital audio signal which has the same number of channels as the first digital audio signal and is obtained without passing through said compressing means is recorded by said recording means.

9. An apparatus according to claim 7, wherein the amount of information per unit time of the first digital audio signal to be recorded in said first mode is equal to that of the second digital audio signal to be recorded in said second mode.

10. An apparatus according to claim 7, wherein said recording means includes a plurality of multiplexing circuits arranged to time-base multiplex every plural number of channels of the first digital audio signal, and a plurality of number of switching circuits arranged to selectively output, in response to said mode changeover means, the digital audio signals output from said plurality of time-base multiplexing circuits or the second digital audio signal.

11. An apparatus according to claim 7, wherein said mode changeover means is arranged to effect changeover between said first mode and said second mode in response to an operation performed on a manual operation member.

12. An apparatus according to claim 7, wherein said mode changeover means includes determining means for determining a tone quality of at least one of the channels of the first digital audio signals, and is arranged to effect changeover between said first mode and said second mode according to an output of said determining means.

13. An apparatus according to claim 12, wherein said determining means includes a separation circuit arranged to separate the digital audio signal into different frequency components.

* * * * *

UNITED STATES PATENT AND TRADEMARK OFFICE
CERTIFICATE OF CORRECTION

PATENT NO. : 5,751,504

DATED : May 12, 1998

INVENTOR(S) : Mitsugu Tanaka

It is certified that error appears in the above-identified patent and that said Letters Patent is hereby corrected as shown below:

Col. 5, line 63, after "signals" insert -- , --.

Col. 6, line 45, after "audio" insert -- signal --.

Signed and Sealed this

Eighth Day of December, 1998

Attest:

BRUCE LEHMAN

Attesting Officer        Commissioner of Patents and Trademarks